United States Patent [19]

Hector

[11] 4,084,194
[45] Apr. 11, 1978

[54] GAME CABINET

[75] Inventor: Roger D. Hector, Santa Clara, Calif.

[73] Assignee: Atari, Inc., Sunnyvale, Calif.

[21] Appl. No.: 768,281

[22] Filed: Feb. 14, 1977

[51] Int. Cl.² ............................................. H04N 5/64
[52] U.S. Cl. ............................. 358/254; 273/DIG. 28
[58] Field of Search .................. 358/254, 242, 182; 273/DIG. 28

[56] References Cited

U.S. PATENT DOCUMENTS

| | | | |
|---|---|---|---|
| 2,832,821 | 4/1958 | Du Mont | 358/242 |
| 2,934,601 | 4/1960 | Oppenheimer | 358/185 |
| 3,461,228 | 8/1969 | Bookman | 358/185 |
| 3,727,000 | 4/1973 | Lollos | 358/254 |
| 3,792,198 | 2/1974 | Hanson | 358/242 |
| 3,940,136 | 2/1976 | Runte | 358/254 |

*Primary Examiner*—Howard W. Britton
*Attorney, Agent, or Firm*—Flehr, Hohbach, Test, Albritton & Herbert

[57] ABSTRACT

A video game cabinet housing two independently operable video games. The television monitor used in one video game is mounted in the lower portion of the cabinet and its presentation is reflected out of the cabinet at eye level by a mirror. The television monitor used in the other video game is mounted in the upper portion of the cabinet opposite the mirror. The second monitor projects its presentation directly out of the cabinet at eye level.

4 Claims, 2 Drawing Figures

U.S. Patent      April 11, 1978      4,084,194
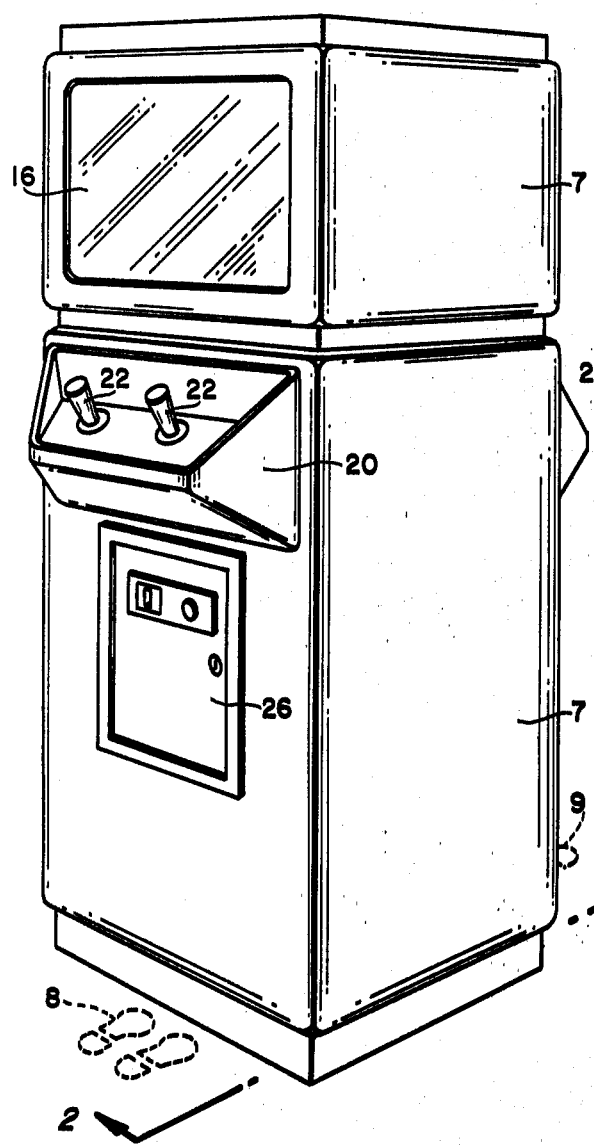
FIG_1
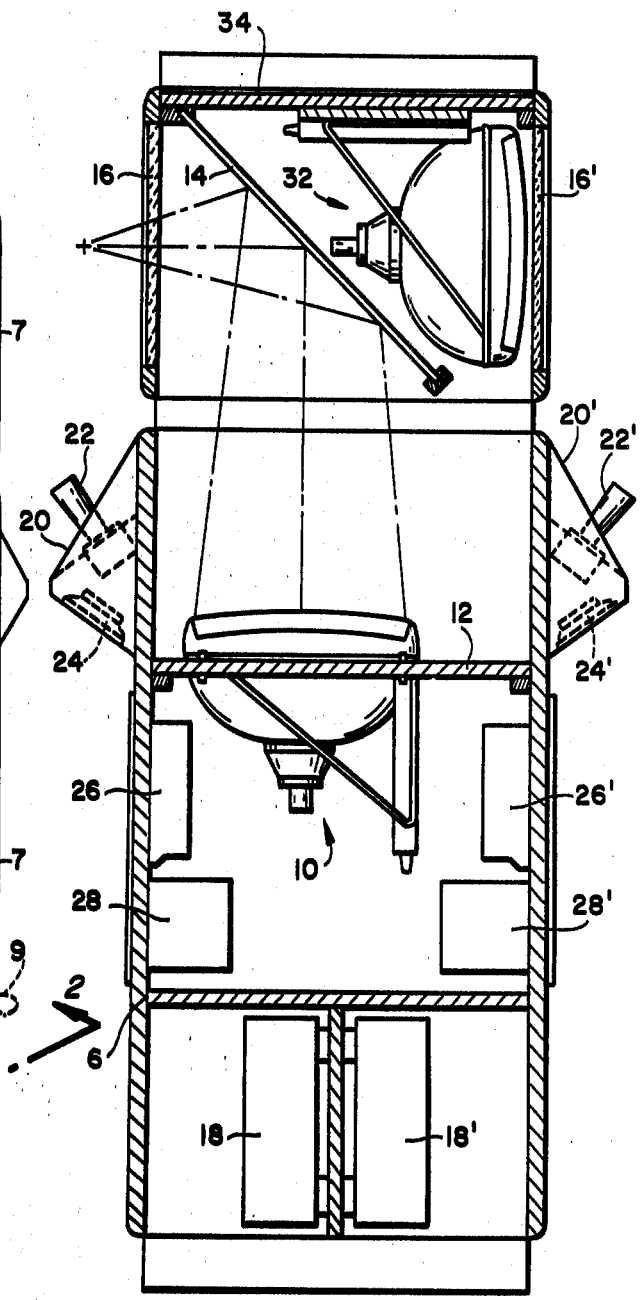
FIG_2

GAME CABINET

BACKGROUND OF THE INVENTION

1. Field of the Invention

The present invention generally relates to housings for amusement games and, in particular, to cabinets for video games.

2. Description of the Prior Art

A coin operated video game is a commercial amusement game generally positioned in locations where members of the public can play the game after depositing a coin. The game itself is displayed and played on the screen of a television monitor and, generally, sound effects accompany the play of the game. The player of the game can manipulate some or all of the images on the screen using control handles that extend from the cabinet. The play of the game, the position of the images, and the interaction between the player and the game are all controlled by electronic logic circuits located within the cabinet.

Heretofore, one problem with coin operated video games has been the extensive space required for each game. These games have usually been mounted in upright cabinets, on cocktail tables, and in kiosks. Each upright cabinet and cocktail table houses one video game and multiple games are contained in the kiosks. In all of these prior arrangements, however, a substantial amount of floor space is required for each installation. This floor space could otherwise be occupied by a second video game or other revenue producing activity.

There has also been a continuing need within the coin operated video game industry for machines that can generate more revenue per square foot of floor space. Up until this time each game cabinet occupied approximately the same floor space and contained only one video game.

SUMMARY OF THE INVENTION

The primary object of the present invention is to overcome the limitations and disadvantages of the prior art.

Another object of the present invention is to provide a game cabinet that maximizes the amount of revenue generated for the owner of the game.

A further object of the present invention is to design a cabinet of refined appearance so that it may be placed in sophisticated locations such as hotel lobbys, restaurants, and ski lodges that customarily do not allow penny arcade-type games while at the same time designing a cabinet that does not restrict itself from being located in arcade locations.

An additional object of the present invention is to provide a cabinet that increases the number of video games in a limited amount of floor space.

Still another object of the present invention is to design a cabinet that allows for easy interchangeability of game electronics and player controls. Once the cabinet is on location, the owner of the cabinet can remove an obsolete game and replace it with a newer game without having to replace the entire cabinet.

These and other objects are achieved by an improved game cabinet housing two independently operable video games. One video game includes a television monitor that is mounted in the lower portion of the cabinet for projecting its presentation in a generally upward direction. This presentation is reflected out of the cabinet by a mirror located at eye level in the upper portion of the cabinet. The other video game includes a second television monitor mounted in the upper portion of the frame. The second monitor projects its presentation directly out of the cabinet at eye level in a generally horizontal direction.

Additional objects and features of the invention will appear from the following description in which the preferred embodiment has been set forth in detail in conjunction with the accompanying drawing.

BRIEF DESCRIPTION OF THE DRAWING

FIG. 1 is a isometric view of the improved game cabinet of the present invention.

FIG. 2 is a side elevational view in section taken along line 2—2 of the game cabinet of FIG. 1.

DESCRIPTION OF THE PREFERRED EMBODIMENT

FIGS. 1 and 2 illustrate one embodiment of the improved video game cabinet according to the present invention. The game cabinet houses two independently operable video games including the associated television monitors and game electronics. The presentation of each game is directed out of opposite sides of the cabinet at eye level in a generally horizontal direction.

The game cabinet, FIGS. 1 and 2, includes a structural frame 6 and a plurality of access panels 7. The structural frame is a rigid, upright structure that supports all of the components therein. In the preferred embodiment the structural frame is a one-piece frame of welded steel. The access panels are exterior covers for the frame that both protect the components within the cabinet from vandalism and permit access to the interior of the cabinet for maintenance. In the preferred embodiment the access panels are plastic covered wooden panels that bolt onto the steel frame.

The game cabinet has two player positions 8, 9, located on opposite sides of the cabinet. At each position a player can manipulate a set of controls and view the presentation from one of the television monitors. At position 8, a player can observe and manipulate video Game A. Game A includes a television monitor 10 vertically mounted in the lower portion of the game cabinet. The chassis of the monitor is secured to a rigid, horizontal member 12 of the structural frame 6. The plane of the screen of the monitor 10 is generally horizontal and the presentation from the monitor 10 is directed generally upward.

The presentation from the television monitor 10 is reflected by an inclined mirror 14 and directed out of the cabinet through a plexi-glass window 16. The mirror 14 is a simple glass mirror, and its angle of inclination is such that the presentation is conveniently viewable by the player of the game. In one embodiment actually constructed, the mirror had an angle of inclination of 38°.

Game A further includes a plurality of printed circuit boards 18 containing the logic and control circuits for the game. These printed circuit boards are mounted on subframes which slide into guides (not shown) on the structural frame 6. The operator playing Game A at position 8 stands in front of a control panel 20 and manipulates the game controls. The control panel is a molded plastic housing that bolts onto the structural frame 6. The control panel area is designed to accept a wide variety of different controls. The game controls can include push buttons, knobs and steering wheels. In the preferred embodiment two joysticks 22 are used to provide the player's manual input to the play of the game. In the lower portion of the control panel is a speaker 24 which transmits the sound affects accompanying the game. Below the control panel is a coin door 26 and a coin box 28. The coin box receives the coins which actuate the play of the game. The circuit boards 18, the control panel 20, the coin door 26, and the coin box 28 are all of known construction and are common to any coin-operated video game.

Game B is viewed and played at position 9, FIG. 1, which is on the other side of the game cabinet from position 8 where Game A is played. Game B includes a television monitor 32 which is mounted to the top wall 34 of the structural frame 6. This monitor generally overlies the monitor 10 described above and is horizontally disposed from the mirror 14. The plane of the screen of this monitor is oriented along a generally vertical plane. The presentation from the television monitor 34 is projected at eye level through a second plexi-glass window 16' along a generally horizontal axis. The components of Game B which are duplicates of the components described above are identified with prime numbers. In each case like numbers identify like parts.

In operation, one player stands in front of the plexi-glass window 16 at position 8 and views the presentation on the television monitor 10. To play Game A, the player inserts coins through the coin door 26 and manipulates the joysticks 22. Another operator can independently play Game B by standing in front of the plexi-glass window 16' at position 9 and viewing the television monitor 32. Both players manipulate the game controls and insert coins in the same manner. As viewed by the players of the two games, the presentations from each side of the game cabinet are substantially the same.

To change one of the games in the cabinet, the side panels 7 are removed and access is gained to the interior of the cabinet. Next, the game electronics 18 and the control panel 20 with its associated controls are removed and replaced with the components of the new game.

Although the best mode contemplated for carrying out the present invention has been herein shown and described, it will be apparent that modification and variation may be made without departing from what is regarded as the subject matter of the invention.

What is claimed is:

1. A video game cabinet, comprising:
   (a) an upright structural frame having at least two vertical walls;
   (b) two windows mounted at eye level elevation in separate vertical walls of the cabinet;
   (c) a first television monitor mounted on the lower portion of the frame and aligned for projecting the presentation therefrom in a generally upward direction;
   (d) a mirror mounted on the frame above the first monitor and positioned for reflecting the presentation therefrom through one of the windows and out of the cabinet; and
   (e) a second independent television monitor mounted on the frame above the first monitor and aligned for projecting the presentation therefrom out through the other window in the cabinet.

2. The apparatus of claim 1 wherein the windows are mounted on opposite walls and both presentations are projected out of the cabinet along the same horizontal axis and in opposite directions so that the presentations can be viewed at opposite sides of the cabinet.

3. A game cabinet for housing two independently operable video games, comprising:
   (a) an upright structural frame;
   (b) a first video game including a first television monitor, coin receiving means, operator controls, and associated electronic circuits;
   (c) means for mounting the first monitor on the lower portion of the frame so that the presentation therefrom is projected in a generally upward direction along a vertical axis;
   (d) a mirror mounted on the frame along the vertical axis and directly above the first monitor; said mirror being positioned for reflecting the presentation therefrom out of the cabinet at eye level;
   (e) a second video game including a second television monitor, second coin receving means, operator controls and associated electronic circuits; and
   (f) means for mounting the second monitor on the frame along the vertical axis such that the presentation therefrom is projected out of the cabinet at eye level.

4. The apparatus of claim 3 wherein the second television monitor includes a CRT with a neck at one end that is proximate to the mirror and both presentations from the monitors are projected out of the cabinet in generally horizontal and opposite directions and at eye level.

* * * * *